Sept. 17, 1929.  W. FRAME  1,728,859
GARTER
Filed Feb. 27, 1929
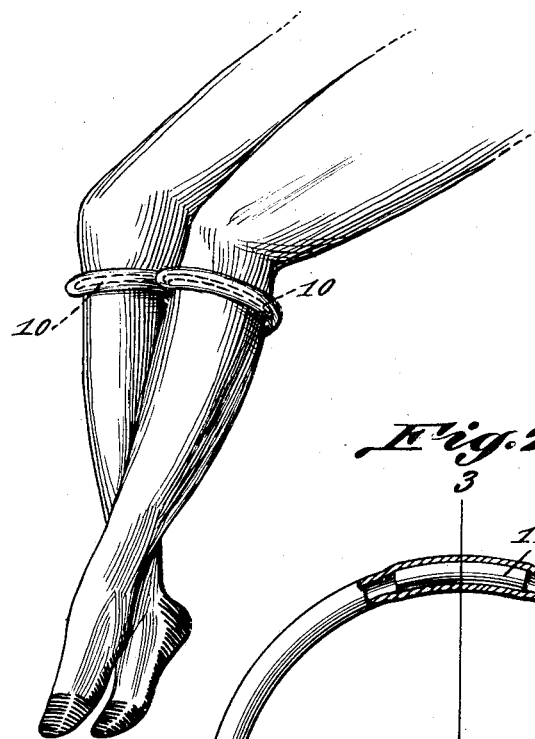
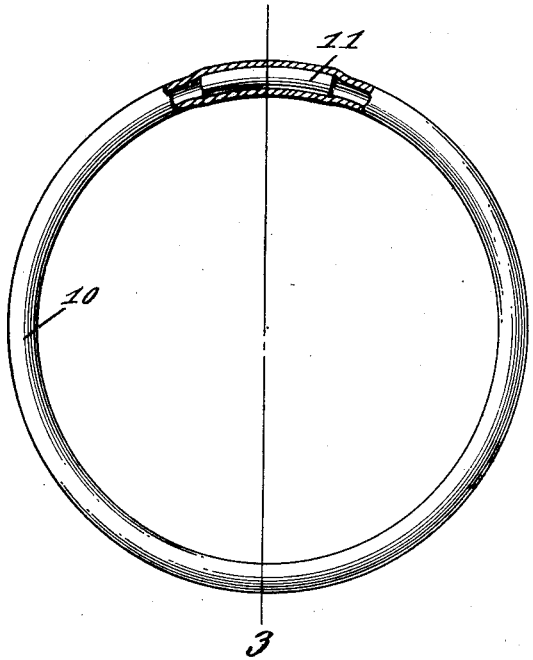
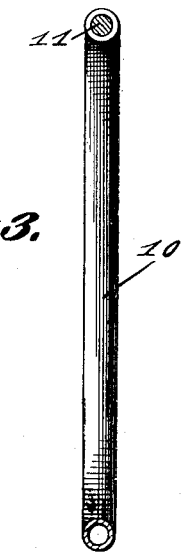
William Frame, INVENTOR
BY Victor J. Evans
ATTORNEY Patented Sept. 17, 1929

1,728,859

UNITED STATES PATENT OFFICE

WILLIAM FRAME, OF NEW YORK, N. Y., ASSIGNOR TO THE COMFEE ROLL GARTER CORPORATION, OF NEW YORK, N. Y., A CORPORATION OF NEW YORK

GARTER

Application filed February 27, 1929. Serial No. 343,063.

This invention relates to improvements in garters especially adapted for use with rolled hose.

An object of the present invention is the provision of a garter for the above purpose which is simple and economical in construction, being made from a length of rubber tubing of a sufficient thickness to prevent collapsing. In addition, the invention provides means by which the top of the hose may be conveniently rolled.

With the above and other objects in view, the invention further includes the following novel features and details of construction, to be hereinafter more fully described, illustrated in the accompanying drawing and pointed out in the appended claim.

In the drawing:—

Figure 1 is a perspective view illustrating the invention.

Figure 2 is an enlarged elevation partly in section.

Figure 3 is a section on the line 3—3 of Figure 2.

Referring to the drawing in detail wherein like characters of reference denote corresponding parts, the garter which is indicated at 10 is formed of a section of rubber tubing, the walls of which are of sufficient thickness to prevent collapsing when in ordinary use. The ends of the tubing are connected by means of a rubber or other flexible plug 11, the ends of which are inserted within the ends of the tubing so as to form an annulus. The plug 11 and the ends of the tubing are connected by vulcanizing or by any other suitable means.

It is believed the use of the invention will be readily apparent from the description and accompanying drawing, the garter being placed at the top of the hose and the latter rolled downward with the garter inside so that the garter will be concealed.

The invention is susceptible of various changes in its form, proportions and minor details of construction and the right is herein reserved to make such changes as properly fall within the scope of the appended claim.

Having described the invention what is claimed is:—

A garter formed of a section of rubber tubing whose ends are abutted, the walls of the tubing being of sufficient thickness to prevent collapsing when in ordinary use, and a flexible plug having its opposite ends secured within the ends of the tubing to connect said ends and provide a garter of substantially uniform cross sectional diameter.

In testimony whereof I affix my signature.

WILLIAM FRAME.